F. W. ROLLER.
ELECTRICAL INSTRUMENT.
APPLICATION FILED NOV. 23, 1914.
1,192,821.
Patented July 25, 1916.
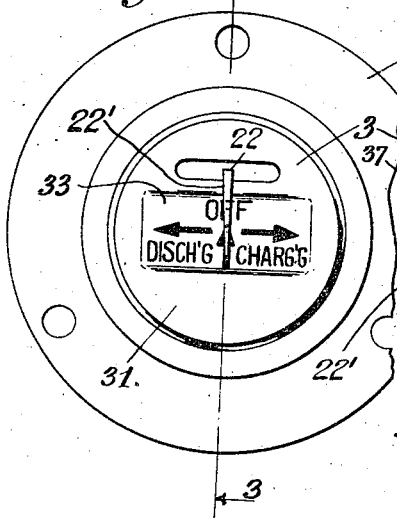
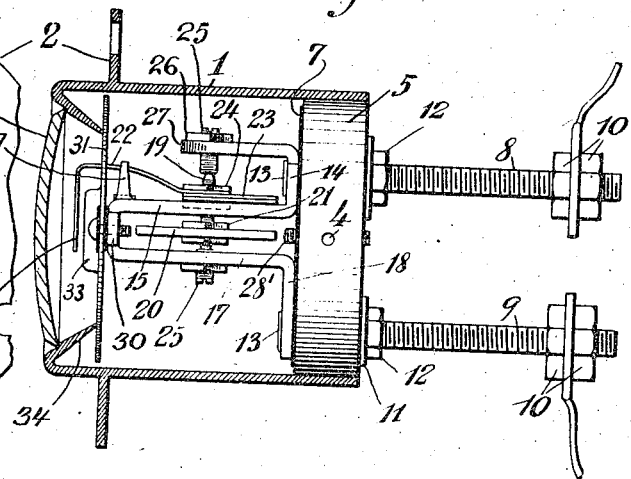
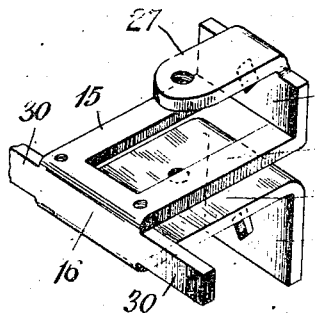
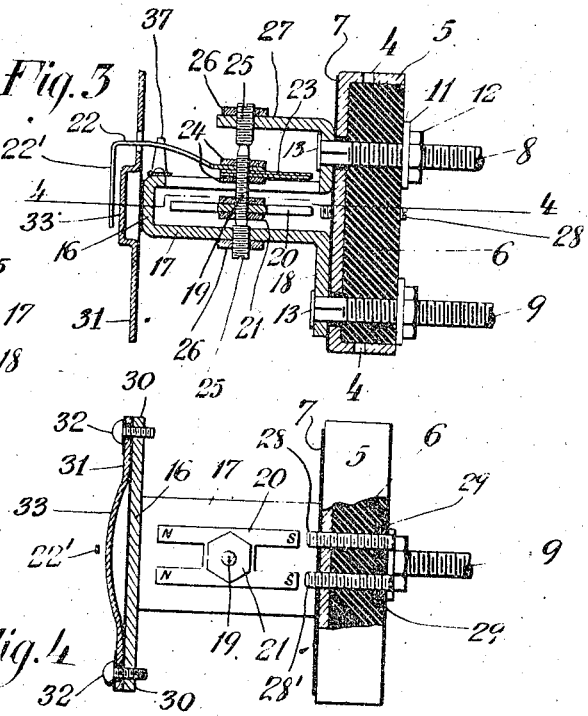
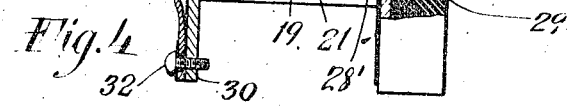

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

ELECTRICAL INSTRUMENT.

1,192,821.  Specification of Letters Patent.  Patented July 25, 1916.

Application filed November 23, 1914. Serial No. 873,671.

*To all whom it may concern:*

Be it known that I, FRANK W. ROLLER, a citizen of the United States, residing at East Orange, in the county of Essex and State of New Jersey, have invented certain new and useful Improvements in Electrical Instruments, of which the following is a full, clear, and exact specification.

This invention relates particularly to means for indicating the direction of current flow in electric circuits, as well as the absence of current.

In certain cases such as in electric equipment of automobiles, wherein a dynamo is used for charging a storage battery, and where the battery serves to supply current to the different translating devices as desired, either by itself or in conjunction with the charging dynamo, it is desirable to provide an indicator which will show the operator the general operating condition of the electrical apparatus, that is whether the battery is being charged, discharged, or neither charging nor discharging, or the disconnected or off condition. In such cases it is unnecessary that the operator should know what particular value of current flow exists, but it is desirable that the operator should know whether the battery is being charged, discharged, or neither charging nor discharging. Furthermore, this indication should be a clear and definite indication.

One object of this invention is to give a definite indication for indicating flow of current in one direction in a circuit, another definite indication for indicating flow of current in the reverse direction, and another definite indication for showing the absence of current and to give a marked separation of the different indications and to avoid any indefiniteness or merging of the indications.

Another object of the invention is to provide in an electrical instrument, a simple construction and such relationship of the parts as to secure rigidity of construction, durability of the parts and economy in the cost of manufacture.

An important feature of my invention thus resides in causing the current coil to be in itself simply and conveniently formed; also in causing the current coil to serve as a support for certain parts, such as the movable element or face plate, or both as in my preferred form of construction.

Other objects and features of improvement of my invention will be understood from the following description and accompanying drawings, which illustrate a preferred form of embodiment of my invention.

Figure 1 is a face view of the instrument, part of the supporting flange being broken away; Fig. 2 is a side view of the instrument showing the casing in a vertical section; Fig. 3 is a vertical sectional view of the working parts on the line 3—3 of Fig. 1; Fig. 4 is a horizontal sectional view on the line 4—4 of Fig. 3, and Fig. 5 is a perspective view of the current carrying and supporting element.

In the form of instrument disclosed, the casing 1 is shown cylindrical and adapted to be inserted through an opening of a supporting board or plate and to be fastened thereto by the flange 2 extending from the casing. The front portion of the casing is inclosed by the glass 3. The working parts of the instrument are removable as a whole from the rear of the casing and held in position within the casing in any suitable manner, such as by screws passing through the casing and entering holes 4 in a closely fitting cup-shaped metal base 5. Within the base 5 is insulation 6, such as hard rubber, and the base is also shown faced with insulation 7, such as mica.

The means for conducting current to and from the instrument are shown as threaded rods 8, 9 having nuts 10 for clamping the incoming and outgoing leads. The inner ends of the rods 8, 9 pass through and electrically engage the current carrying and supporting element of the instrument, the rods having heads 13 which seat against this element. The rods are insulated from the base 5 by insulating bushings as shown. Nuts 12 on the rods seat against washers 11 and serve to clamp all parts firmly together. This current carrying and supporting element is made up to form a single turn or loop from one conducting screw 8 to the other conducting screw 9. Thus in the form shown the upper expanded head 13 is secured and electrically connected to a vertical part 14 from the lower portion of which extend two horizontal arms 15, 15, at the outer ends of which is a vertical portion 16 from which there inwardly extends a horizontal portion 17, at the inner end of which is a vertically extending portion 18, to which the head 13 of the conducting screw 9 is connected. Thus the path of the current is directly from one conducting screw to the other through a single loop or turn of the conducting element of the instrument. It will be seen that the conducting element in its extent between the two screws 8 and 9 has a U-shape with an outgoing part and a returning part. Aside from there being merely an electrical connection between the conducting screws 8, 9 and the conducting element as above described, it will be understood that the screws 8, 9 by means of the nuts 12 and heads 13 serve to rigidly support the conducting element of the instrument in position.

The movable element of the instrument is made up, in the form shown, of a screw-threaded shaft 19, which carries an H shaped permanent magnet 20, the form of which is well shown in Fig. 4. This magnet has its poles nearest the face of the instrument of one polarity, as indicated by the letters N, N in Fig. 4, and the opposite ends of the magnet are of the opposite polarity, as indicated by the letters S, S in Fig. 4. This magnet is held in fixed position on the shaft 19 by the nuts 21. The shaft 19 also carries an indicating needle or pointer 22; also the parts 23 for counter-balancing the weight of the pointer, these parts being clamped in fixed position on the shaft 19 by nuts 24. The movable element is supported by its shaft 19 in adjustable bearing screws 25 having lock washers 26. The lower bearing screw is carried by the horizontally extending portion 17 of the conducting element. The upper bearing screw 25 is supported by a horizontal extension 27 which extends from the vertical portion 14 of the current carrying element. Stops 37, for limiting the maximum deflection of the pointer, are also carried by the current carrying element.

Opposite the two inner ends of the H shaped permanent magnet 20 are located two screws 28, 28' of magnetic material, these screws being shown extending through the base 5 and insulation 6, as well shown in Fig. 4, and are adjustable therein, being locked in any desired position by the nuts 29.

The current carrying element, in addition to supporting the movable element as above described, also supports, in the form shown, the indicating plate of the instrument. For this purpose the current carrying element is provided with two extending portions 30, which extend from the vertical portion 16. The indicating plate 31 is shown as a circular plate fastened to the ends of the arms 30 by the screws 32, the indicating plate being preferably insulated from the current carrying element. The plate has an outwardly extending rounded portion 33 upon which are marked suitable arrows and indications as shown in Fig. 1, the neutral position being marked "Off", the extreme left-hand position being marked "Discharging", and the extreme right-hand position being marked "Charging." The indicating pointer 22 extends through a slot in the scale plate and has a downwardly projecting part 22' so as to swing over the rounded portion of the indicating plate. The indicating plate engages an inwardly extending circular flange 34 of the casing as shown in Fig. 2 of the drawings, thus serving to give a finished appearance to the face of the instrument.

When no current is passing through the instrument, the movable element will take the position shown in Fig. 4, the magnetic attraction between the magnetic elements 28, 28' and the adjacent poles of the permanent magnet 20 tending to hold the movable element in the mid position, giving the no current or off indication. When current flows through the current carrying element in one direction, a magnetic flux is set up in one direction within the single turn of the current carrying element. The permanent magnet 20 will then turn in a corresponding direction, tending to place itself parallel with the lines of force within the current carrying element. The tendency of the magnetic parts 28, 28' to hold the movable element in mid position is overcome by a comparatively slight flow of current through the current carrying element, and as soon as the permanent magnet moves slightly from the position shown in Fig. 4, and while it continues to move therefrom, the magnetic force of attraction between the permanent magnet and the elements 28, 28' decreases. This permits the movable element to rapidly shift to one side after it is once started by the presence of current through the instrument. Thus, upon the passage of current in one direction, the movable element will rapidly shift to its maximum deflection in one direction, giving a clear and definite indication that current is flowing in that particular direction which we may assume is the direction of the charging current to a battery, the pointer 22' moving to the maximum distance to the right of Fig. 1. This rapid maximum deflection is further assisted by the fact that the pole of the magnet that was previously opposite the element 28' is shifted, in the direction assumed, toward the element 28 giving an increasing force tending to swing the magnetic element to its maximum deflection because the nearer the pole of the magnet 20, which was previously opposite the element 28', approaches the element 28, the greater is the attraction between them. This action thus assists in causing the movable element to give a certain and definite rapid swing to the maximum deflection, thus avoiding any uncertainty in the indication, or any definite merger of indications.

When current passes through the current carrying element in the opposite direction from that above assumed, the magnetic element 20 will of course shift in the opposite direction from mid-position, and the pointer will then swing to the maximum deflection to the left of Fig. 1, giving an indication of direction of current which is say, the discharging direction from a battery. The action in shifting the neutral element in this latter direction will of course, be the same as that above described with reference to the opposite direction of current. When no current passes through the instrument, the movable element will immediately swing to the mid- or off position by reason of the magnetic elements 28, 28' serving to jointly attract the ends of the permanent magnet.

It will be noted that the current carrying element of the instrument is a single piece which can be readily stamped or cut out of sheet metal and then bent to the form shown. It will also be noticed that the element has large current capacity, and by forming a single turn is of the simplest form electrically. Also by reason of its shape and relation to the other parts of the instrument, the necessity of various additional elements is avoided, the current carrying element serving in itself to support the movable element as well as the indicating plate. Moreover, the relationship of the parts is such that the instrument as a whole may be removed from the rear of the casing without in any way disturbing the relative position of the parts, thus giving the greatest facility for inspection or for any repairs. Furthermore, by reason of the simplicity of the construction and the novel relationship of the elements, the instrument is rugged and durable in construction, and is well adapted to withstand severe shocks or jars in service.

Although I have described one particular embodiment of my invention, it will be understood that my invention may be embodied in various forms of construction, and some features are particularly applicable to various types of electrical instruments, other than to the type particularly described, wherein the indications given are merely for indicating the direction of current or absence of current.

Having thus described my invention, what I declare as new and desire to secure by Letters Patent of the United States is:—

1. In an electrical instrument, the combination of a base, current carrying means projecting therefrom, a movable element supported and actuated by said current carrying means, an indicating plate carried by said current carrying means, the axis of said movable element being parallel to said plate, and a casing supported by said base.

2. In an electrical instrument, the combination of U-shaped current carrying means, a movable element within the sides of said means and normally extending parallel with said sides, and an indicating disk carried by said current carrying means and having the central portion of said disk located opposite the middle point of said U-shaped current carrying means.

3. In an electrical instrument, the combination of a base, a current carrying element having oppositely located portions parallel to each other extending outwardly from said base, a movable element having its axis perpendicular to said portions and centrally located with relation to said portions, and an indicating plate supported by said current carrying element opposite to said base.

4. In an electrical instrument, the combination of a base, a current carrying element having oppositely located portions parallel to each other extending outwardly from said base, a movable element having its axis perpendicular to said portions and centrally located with relation to said portions, an indicating plate carried by an outer portion of said current carrying element, and a casing supported by said base.

5. In an electrical instrument, the combination of a base, a current carrying element of sheet metal having a supporting portion parallel to and supported on said base, an outwardly extending portion and an inwardly extending portion, a movable element located between said portions and having its axis parallel to said base, and an indicating element supported by said current carrying element opposite to said base.

6. In an electrical instrument, the combination of a movable magnetic element, means for actuating said element, and a plurality of stationary magnetic elements adapted to successively coöperate with a portion of said movable element.

7. In an electrical instrument, the combination of a movable magnetic element having a plurality of extending portions, means for actuating said element, and a stationary magnetic element adapted to successively coöperate with said extending portions of said movable element.

8. In an electrical instrument, the combination of a current carrying element, a movable element, means acting upon said movable element tending to hold the same in a certain position but with a decreasing force the more said element is shifted from said position and also acting upon said movable element tending to shift it farther from said position with a superposed force which increases as said movable element is deflected from said position.

9. In an electrical instrument, the combination of a current carrying element, a movable element deflected from its initial position upon passage of current through said first named element, magnetic means acting upon said movable element tending to hold the same in its initial position but with a decreasing force the more said element is shifted from said position and also acting upon said movable element tending to shift it farther from said position with a superposed force which increases as said element is deflected from said position.

10. In an electrical instrument, the combination of a current carrying element, a movable element deflected from its initial position upon passage of current through said first named element, said movable element comprising a plurality of extending portions, and magnetic means coöperating with one of said portions tending to hold said movable element in its initial position and coöperating with another of said portions tending to hold said movable element in a deflected position.

11. In an electrical instrument, the combination of a current carrying element, a movable element, said movable element having plurality of extending portions, and magetic means acting upon one of said portions tending to hold said movable element in its initial position but with a decreasing force the more said movable element is shifted from said position and acting upon another of said portions tending to hold said movable element in a deflected position and with an increasing force as said movable element is deflected from its initial position.

12. In an electrical instrument, the combination of a current carrying element, a movable magnetic element affected thereby and having a plurality of extending polar portions of the same polarity, and a plurality of stationary magnetic elements coöperating with said extending portions and tending to restrain the same against the effect of current in said current carrying element, each of said polar portions being adapted to register in succession with said stationary magnetic elements.

13. In an electrical instrument, the combination of a sheet metal current carrying element, a movable magnetic element supported within and by said current carrying element, an indicating plate supported by said current carrying element in front of said movable element, and magnetic means tending to hold said movable element in a certain position and located in the rear of said movable element.

14. In an electrical instrument, the combination of a base, a current carrying element of sheet metal having terminal portions thereof adjacent to said base, screw threaded rods and clamping nuts fastening said portions to said base and also adapted to serve as conductive connections to said current carrying element, the intermediate portion of said current carrying element extending outwardly perpendicular to said base and returning inwardly parallel to said outwardly extending portion, a movable element located between said portions and supported thereby and having its axis parallel to said base and a pointer carried by said movable element and projecting therefrom away from said base.

15. In an electrical instrument, the combination of a base, a current carrying element of sheet metal having a supporting portion parallel to and supported on said base, an outwardly extending portion and an inwardly extending portion, a movable element located between said portions and supported thereby and having its axis parallel to said base, an indicating plate carried by an outer portion of said current carrying element, and a pointer carried by said movable element adapted to coöperate with said plate.

16. In an electrical instrument, a conductor, a movable element in proximity thereto, a stationary element of magnetic material adjacent to said movable element, one of said elements having a plurality of salient parts adapted to register successively with the other element, whereby the movable element will tend to stop at a definite corresponding position for a given condition of current in said conductor.

17. In an electrical instrument, a conductor, a movable element in proximity thereto, and magnetic means acting upon said movable element tending to hold the same in any one of three definite positions correspondingly relatively to the condition of said conductor according as it is carrying current in one direction, or is currentless, or is carrying current in the opposite direction.

18. In an electrical instrument the combination of a current carrying element, a movable magnetic element affected thereby and having a plurality of extending polar portions of like polarity side by side, and a plurality of stationary magnetic elements with which said polar portions are adapted to register successively.

19. In an electrical instrument, the combination of a sheet metal current carrying element having an outgoing part and a return part, a movable magnetic element supported by said current carrying element and located between the said parts thereof, and magnetic means tending to hold said movable element in any one of a limited plural number of definite positions.

20. In an electrical instrument, the combination of a sheet metal conductor bent upon itself so as to have an outgoing and a returning portion, a movable magnetic element supported between said portions, a base to which said conductor is attached and magnetic means mounted on said base and adapted to register with said movable magnetic element so as to hold the latter in any one of a limited plural number of definite positions.

21. In an electrical instrument, the combination of a base, a conductor attached thereto with an outgoing part and a returning part, a movable magnetic element supported between said parts and means supported on said base to register with said movable magnetic element and hold the same in any one of a limited plural number of definite positions.

22. In an electrical instrument, a conductor, movable magnetic means, stationary magnetic means adjacent to said movable magnetic means, one of said means having a plurality of salient parts adapted to register successively with the other means whereby the movable means will tend to stop at a definite corresponding position for a given condition of current in said conductor.

In testimony whereof I affix my signature, in presence of two witnesses.

FRANK W. ROLLER.

Witnesses:
 L. K. SAGER,
 M. D. ISREL.